United States Patent Office 3,391,183
Patented July 2, 1968

3,391,183
METHOD OF PREPARING BETA-HYDROXYALKYL ESTERS INCLUDING THE ISOMERIZATION OF MALEIC ACID HALF-ESTERS
Rostyslaw Dowbenko, Gibsonia, Pa., assignor to Pittsburgh Plate Glass Company, Pittsburgh, Pa., a corporation of Pennsylvania
No Drawing. Filed Aug. 28, 1964, Ser. No. 392,908
10 Claims. (Cl. 260—485)

ABSTRACT OF THE DISCLOSURE

The invention relates to a method of isomerizing a maleic acid half-ester, corresponding to the formula

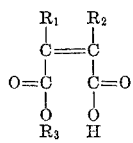

where $R_1$ and $R_2$ are independently selected from the group consisting of hydrogen, chlorine, bromine and lower alkyl and $R_3$ is an organic radical derived by eliminating the hydroxyl group from a monohydric alcohol capable of forming a maleic acid half-ester, to the corresponding fumaric acid half-ester, which comprises heating the maleic acid half-ester in the presence of a catalytic amount of a chloride selected from the group consisting of titanium tetrachloride and silicon tetrachloride, and further to a method of preparing beta-hydroxyalkyl esters in an integrated process comprising isomerization of a maleic half-ester and subsequent reaction with an alkylene oxide.

---

This invention relates to the conversion of cis alpha, beta-unsaturated dicarboxylic acid half-esters to their trans isomers. Further, this invention relates to an integrated process for the production of β-hydroxyalkyl fumarates.

Interest has recently been aroused in the use of fumaric acid derivatives as comonomers in acrylic polymers of both the thermoplastic and thermosetting variety. Due to the commercial implication of these materials, new monomers having more desirable properties and new methods for producing such monomers more economically and in high purity have been sought.

It has now been found that a maleic acid half-ester, corresponding to the formula:

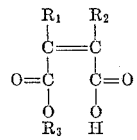

(I)

where $R_1$ and $R_2$ are independently selected from the group consisting of hydrogen, chlorine, bromine, fluorine, and lower alkyl radicals, and where $R_3$ is an organic radical derived by elimination of the hydroxy group from an alcohol capable of forming a maleic acid half-ester, may be isomerized in the presence of a catalyst selected from the group consisting of titanium tetrachloride, silicon tetrachloride and aluminum trichloride, to form the corresponding fumaric acid half-ester isomer.

As stated previously, one purpose of this invention is to provide a simple, rapid and economical method of preparing half-esters of fumaric acid.

The isomerization is conducted by charging the maleic acid half-ester into a reaction vessel and heating. The catalyst is then added and the reactor maintained at the desired temperature. The isomerization may also be carried out in the presence of an alert solvent or diluent such as benzene, toluene, carbon tetrachloride, chloroform, tetrachloroethane, octane, and the like. One method of controlling the temperature of the reaction is by the use of a solvent or diluent boiling at the desired temperature and maintaining the reaction at reflux.

The temperature at which the isomerization is conducted may be varied widely. Although the reaction proceeds at room temperature, the time required to obtain substantial yields is prohibitive by commercial standards. Preferably, the isomerization is conducted at a temperature of from about 50° C. to about 125° C. or higher. Most preferably, the reaction is conducted at about 100° C. At temperatures above about 125° C., while the desired product is still obtained, undesirable side reactions such as disproportionation cause a reduction in the apparent percentage conversion.

The amount of isomerization catalyst employed is usually from about 0.05 percent to about 5 percent. Larger amounts may be used, but apparently do not appreciably increase the conversion. Preferably, the isomerization catalyst is employed in an amount of from about 0.25 percent to about 2 percent. It has also been found that maleic anhydride or substituted maleic anhydrides may be converted by an integrated process to organo beta-hydroxyalkyl fumarates without isolation or purification of intermediate products.

The anhydride utilized in the process of this invention may be maleic anhydride and a mono- or disubstituted maleic anhydride such as those corresponding to the formula:

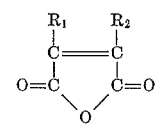

where $R_1$ and $R_2$ are independently selected from the group consisting of hydrogen, chlorine, bromine, fluorine, and lower alkyl radicals. Examples of such anhydrides include methyl maleic anhydride, dimethyl maleic anhydride, chloromaleic anhydride, dichloromaleic anhydride, bromomaleic anhydride, and the like.

The maleic anhydride or substituted maleic anhydride is first reacted with a monohydric alcohol to form the corresponding half-ester. While no catalyst is essential in conducting this reaction, it has been found that an amine catalyst at least in some instances promotes the reaction, or allows the reaction to proceed at a practical rate at a lower temperature. To the reaction mixture is then added a catalytic amount of an isomerization catalyst, isomerizing the maleic acid half-ester present in the reaction mixture to the corresponding fumaric acid half-ester. After the isomerization is complete, a 1,2-alkylene oxide is added to the reaction mixture and the hydrogen fumarate converted to the corresponding organo beta-hydroxyalkyl fumarate.

Essentially, any monohydric alcohol can be employed to produce the half-esters, since the intermediate products of the invention are achieved with any monohydric alcohol which, when reacted with the anhydride ring, forms a half-ester, for example:

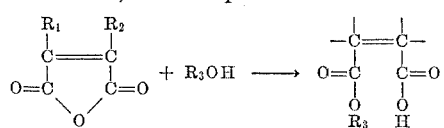

where $R_3$ is an organic radical derived by elimination of the hydroxyl group from the alcohol employed to open the anhydride ring to form a half ester.

The preferred alcohols are alkanols containing up to 10 carbon atoms including methanol, ethanol, 1-propanol, 2-propanol, 1-butanol, 2-methyl-1-propanol, 2-butanol-1- pentanol, 2-ethyl-1-hexanol. Other alcohols include lower alkyl monoethers of ethylene glycol (Cellosolves) and the corresponding monoethers of diethylene glycol (Carbitol). Other alcohols which may be utilized are longer chain alcohols such as linseed fatty alcohols and other fatty alcohols, longer chain monoethers of glycols, cyclic alcohols such as cyclopentanol, cyclohexanol and furyl alcohol and aromatic alcohols such as benzyl alcohols, as well as halogen substituted derivatives of the foregoing.

The alkylene oxide utilized in the process of this invention may be any 1,2-alkylene oxide. Examples of such alkylene oxides are ethylene oxide, propylene oxide, butylene oxide, and the like. Preferably, the alkylene oxide contains 2 to 4 carbon atoms. More preferably, the alkylene oxide is selected from the group consisting of ethylene oxide and propylene oxide.

Alternatively, a corresponding maleate half-ester may be utilized as a starting material, eliminating the step of its production from the anhydride and the monohydric alcohol compound. Many of these materials are items of commerce, for example, butyl hydrogen maleate.

The first stage reaction between the anhydride and the hydroxyl compound may be conducted at a temperature of from about 0° C. to about 100° C. or higher. Preferably, the reaction is conducted at a temperature of from about 50° C. to about 80° C. The proportions of the reactants may be varied widely. The use of less than one mole of the hydroxy compound per mole of anhydride obviously results in a lower percent conversion. Likewise, where a large excess of hydroxy compound is employed, especially at higher temperatures, some diester formation will occur, lessening the percent conversion of the desired product. Preferably, from about 1.0 mole to about 1.1 moles of the hydroxy compound is employed for each mole of anhydride.

As previously stated, while not essential, it is desirable to have an amine type catalyst present in the reaction mixture during the initial esterification step. Suitable amines are tertiary amines such as triethylamine and triisopropylamine.

The second stage of the reaction is initiated by the addition of a catalytic amount of isomerization catalyst described above, i.e., a member selected from the group consisting of titanium tetrachloride, silicon tetrachloride and aluminum trichloride in an amount and at a temperature as described above.

In the third stage of the reaction, the alkylene oxide is added to the reaction. Preferably, a slight molar excess, about 0.1 to 0.2 mole of the alkylene oxide, is used to achieve maximum conversion. Less than a molar amount of the alkylene oxide may be employed; however, the overall percent conversion will obviously be reduced. Likewise, when a large excess of alkylene oxide is employed, the desired monoester is still produced under mild condition; however, some diester is formed, reducing the total conversion.

Preferably, the alkylene oxide addition is carried out by heating the reaction product of stage two to the desired reaction temperature. The alkylene oxide is then incrementally added over a period of time, usually from about 1 to 2 hours. When the addition is completed, the reaction mixture is preferably maintained at the desired reaction temperature until the reaction has gone substantially to completion. The total reaction time may be varied from about 2 to about 15 hours, or more. Usually, the reaction is substantially complete in about 10 to about 15 hours.

The third stage reaction temperature may be varied over a wide range. The reaction is preferably conducted at a temperature of from about 50° C. to about 80° C. While the reaction proceeds at room temperature, the rate is substantially slower than at slightly elevated temperatures. At higher temperatures, volatilization of the reactants and undesirable side reactions complicate the procedure and reduce the yield; however, the desired product is formed up to about 125° C.

Alternatively, the total charge of the third stage reactants may be mixed together and reacted. The use of pressure vessels may be desired when the reaction is conducted in this manner, especially when elevated temperatures are employed in order to maintain the reactants in solution.

The products of the integrated process of this invention are beta-hydroxyalkyl fumarates corresponding to the formula:

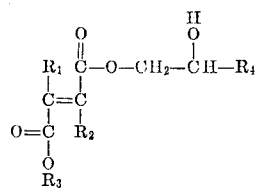

where $R_1$ and $R_2$ are independently selected from the group consisting of hydrogen, chlorine, bromine, fluorine and lower alkyl radicals, and where $R_3$ is an organic radical derived by the elimination of the hydroxyl group from the alcohol employed to open the anhydride ring, and $R_4$ is an alkyl radical.

Examples of such compounds include:

Ethyl β-hydroxyethyl fumarate
Propyl β-hydroxyethyl fumarate
Butyl β-hydroxyethyl fumarate
Ethyl β-hydroxypropyl fumarate
Propyl β-hydroxypropyl fumarate
Butyl β-hydroxypropyl fumarate
2-ethylhexyl β-hydroxypropyl fumarate
2-ethylhexyl β-hydroxyethyl fumarate These compounds, as well as the fumaric acid half-esters formed by the isomerization reaction, find utility as comonomers in vinyl polymerizations, building residual functionality into the polymer chain.

There are set forth below several examples which illustrate the methods of producing the compounds of this invention and the manner in which these compounds were isolated and identified. These examples are, of course, given by way of illustration only and should not be construed as limiting the invention to the particular details thereof. All parts and percentages set forth, as is true throughout the specification, are by weight unless otherwise specified. All reduced pressure boiling points are stated in millimeters of mercury.

EXAMPLE I

Preparation of butyl hydroxypropyl fumarate

Into a reactor equipped with a reflux condenser, stirrer, thermometer and water jacket were charged 98.1 grams of maleic anhydride, 74.1 grams of butanol and 0.3 milliliter of triethylamine. The above were then slowly heated. The reaction mixture began to go into solution at about 45° C. An exotherm was apparent at 75° C. The reaction temperature was controlled at about 75° C. first by cooling and then by heating. After 5.5 hours, infrared analysis showed anhydride to be present. There was then added 2 grams of butanol and 1 milliliter of triethylamine. After a total reaction time of 14 hours, at 75° C., infrared analysis showed that substantially no anhydride remained.

There was then added to the reaction flask 1.72 grams of titanium tetrachloride. A slight exotherm was noted. The reaction mixture was then heated to 100° C. After about 30 minutes, a solid was apparent in the reaction mixture. The reaction mixture was heated for a total of 3 hours, at which time a large amount of solid was present in the reaction mixture.

The temperature of the reaction mixture was then adjusted to 75° C. Sixty-one (61) grams of propylene oxide was then added to the reaction mixture slowly through a dropping funnel. The reaction was exothermic. The reaction temperature was controlled at about 75° C.

first by cooling and subsequently by heating. The propylene oxide addition was complete after 30 minutes, at which time the reaction mixture was homogeneous. The reaction mixture was maintained at 75° C. for a total reaction time of 13.5 hours and then cooled to room temperature.

The reaction mixture was then dissolved in diethyl ether and washed three times with aqueous sodium bicarbonate, then with water. The water washings were discarded. The ether layer was evaporated on a steam bath under a vacuum of about 15–20 millimeters of mercury to yield 218.3 grams of material. The reaction mixture was further evaporated under a vacuum of about 0.1 millimeter with the pot temperature at about 50° C. to yield 209.7 grams of butyl hydroxypropyl fumarate, which was then filtered through a fluted filter paper. The infrared spectrum of the product showed a medium band at 2.9 microns, a strong band at 5.8 microns and a weak band at 6.1 and 12.9 microns.

EXAMPLE II

Preparation of butyl hydroxypropyl fumarate

Into a reactor equipped with a reflux condenser, stirrer and thermometer were charged 344.4 grams of butyl hydrogen maleate and 3.44 grams of titanium tetrachloride. A slight exotherm was noted. A small amount of solid was apparent in the reaction mixture. The reaction mixture was heated to and maintained at 100° C. for 3 hours. The reaction mixture was then cooled to 75° C. and 119.0 grams of propylene oxide was slowly added through a dropping funnel. The addition was complete after 1 hour. A small reflux was apparent at the end of the addition. Shortly after the addition was completed, the reaction mixture was homogeneous. The reaction mixture was maintained at 75° C. for 9 hours after the addition was complete. The reaction mixture was then cooled to room temperature.

The reaction mixture was dissolved in ether and washed four times with aqueous sodium bicarbonate, then with a saturated sodium chloride solution. The ether layer was then evaporated on a steam bath under a vacuum of about 25 millimeters mercury. There remained 416.7 grams of liquid. This was then evaporated under a vacuum of about 0.1 millimeter maintaining the pot temperature about 50° C. to obtain 409.0 grams of butyl hydroxypropyl fumarate. The infrared spectrum of the product has a medium band at 2.90 microns, a strong band at 5.83 microns and a medium band at 6.12 microns.

EXAMPLE III

Preparation of 2-ethylhexyl hydroxyethyl fumarate

Into a reactor equipped with a reflux condenser, stirrer, thermometer and water jacket were charged 981 grams of maleic anhydride and 1315 grams of 2-ethylhexyl alcohol. The above charge was heated slowly at 50° C., a slight exotherm was apparent. After the exotherm was spent the charge was heated to 75° C. and maintained at 75° C. for a total of 8 hours.

There was then added to the reaction flask 23 grams of titanium tetrachloride and the reaction mixture heated to 100° C. The reaction temperature was maintained at 100° C. for 3 hours.

The reaction mixture was then cooled to 75° C. and 463 grams of ethylene oxide was added dropwise over a period of 2¾ hours. The reaction initially was exothermic and the temperature was maintained at 75° C. by cooling and varying the rate of addition. The reaction mixture was heated for 7½ hours at 75° C. after completion of the addition.

The reaction mixture was then cooled to room temperature and 100 grams of sodium bicarbonate were added and the mixture stirred for 30 minutes, pH 6–7. One-half (½) of the reaction mixture was then poured into a separatory funnel and 350 milliliters of water and 1.5 liters of ethyl acetate was added and the mixture well shaken. The lower phase was drained and discarded.

The ethyl acetate phase was filtered and the solvent removed under vacuum, maintaining the temperature below 50° C. The product was then filtered to yield a clear amber product. The second portion of the reaction mixture was worked up in a similar manner. Total weight 2428 grams; $n_D^{25}$ 1.4672.

EXAMPLE IV

Preparation of isopropyl hydroxypropyl fumarate

Into a reactor equipped with a reflux condenser, stirrer, thermometer and water jacket were charged 981 grams of maleic anhydride and 606 grams of isopropyl alcohol. The above mixture was then heated slowly. A slight exotherm was apparent at 50° C. After the exotherm was spent, the reaction mixture was heated to 75° C. and maintained at 75° C. for 6 hours, then 100° C. for 2 hours. The reaction mixture was then cooled to room temperature and 15 grams of titanium tetrachloride added. A slight exotherm was noted. The reaction mixture was then heated at 100° C. for 2.5 hours, then cooled to 75° C.

Six hundred ten (610) parts of propylene oxide was then added dropwise over a period of 2 hours while maintaining the temperature at about 75° C. The reaction was heated for an additional 7 hours at 75° C., then cooled to room temperature. Forty (40) grams of $NaHCO_3$ and 200 milliliters of water were added to the reaction vessel and the mixture stirred for 30 minutes. Twenty (20) additional grams of $NaHCO_3$ were added and the mixture stirred for an additional 30 minutes. One-half (½) of the reaction mixture was poured into a separatory funnel to which 1.5 liters of ethyl acetate was added. Ethyl acetate layer was washed twice with an $NaHCO_3$ solution and filtered. The product was then isolated by removing the solvent under vacuum at a temperature below 50° C. The product was then filtered again. The second portion of the reaction mixture was worked up in a similar manner to give 1758 grams of product, $n_D^{24}$ 1.4562.

EXAMPLE V

Isomerization of butyl hydrogen maleate with titanium tetrachloride

Into a reactor equipped with a reflux condenser, stirrer and thermometer were charged 86.0 grams of butyl hydrogen maleate and 0.86 gram of titanium tetrachloride. A slight exotherm was apparent. The reaction mixture was then heated to 100° C. After about 40 minutes at 100° C., a solid appearing to be coming out of solution. Samples were withdrawn from the reaction flask at reaction times of 1, 3, 6½ and 14 hours.

The samples were analyzed for percent conversion in the following manner:

The 17.2 gram sample withdrawn after 1 hour was charged into a flask with 30 grams of butanol, 20 cubic centimeters of toluene and 0.5 gram of concentrated sulfuric acid. The flask was equipped with a stirrer, thermometer, condenser and water trap. The reaction mixture was heated to reflux. After 1 hour and 20 minutes, 2.8 cubic centimeters of water had been withdrawn from the reactor. The reaction mixture was cooled to room temperature and washed with sodium bicarbonate solution and a sodium chloride solution. The dried organic layer was submitted to gas chromatography which showed 97.0 percent dibutyl fumarate and 3.0 percent dibutyl maleate, indicating that in 1 hour the titanium tetrachloride catalyst had produced 97 percent conversion. Examination of the remaining samples in a similar manner showed 99 percent fumarate at the end of 3 hours and 99.3 percent after 6½ hours, and 99.0 percent after 14 hours.

EXAMPLE VI

Isomerization of butyl hydrogen maleate with silicon tetrachloride

Into a reaction equipped with a reflux condenser, stirrer, and thermometer were charged 86 grams of butyl hydrogen maleate and 0.86 gram of solicon tetrachloride. A slight exotherm was apparent. The reaction mixture was heated to 100° C. and maintained at 100° C. for the remainder of the reaction times. Seventeen and two-tenths (17.2)-gram samples were withdrawn at the end of 1, 3, 6 and 13½ hours and percent conversion determined as in Example V.

| Time (hours): | Percent fumarate |
|---|---|
| 1 | 94.3 |
| 3 | 97.7 |
| 6 | 98.8 |
| 13½ | 98.5 |

EXAMPLE VII

Isomerization of butyl hydrogen maleate with aluminum trichloride

Into a reaction equipped with a reflux condenser, stirrer and thermometer were charged 86 grams of butyl hydrogen maleate and 0.86 gram of aluminum chloride. A slight exotherm was apparent. The reaction mixture was then heated to and maintained at 100° C. Seventeen and two-tenths (17.2)-gram samples were withdrawn at the end of 1, 3, 6 and 13½ hours, and percent conversion to fumarate determined as in Example V.

| Time (hours): | Percent fumarate |
|---|---|
| 1 | 83.7 |
| 3 | 95.5 |
| 6 | 97.5 |
| 13½ | 98.2 |

The progress of the reaction in the various stages and the degree of conversion can be conveniently followed by periodically withdrawing samples and determining infrared spectrum and acid number, and by the use of a gas chromatograph.

The esters produced by the process of this invention may be isolated from the reaction mixture by conventional techniques known to the organic chemist. The desired ester may be isolated by distilling the reaction mixture under reduced pressure. Alternatively, where the bulk of impurities constitute relatively volatile starting materials, these may be removed by distillation or by passing a gas such as nitrogen through the reaction mixture to remove such relatively volatile impurities. The resulting residue, comprising mainly the esters of the invention may be employed in subsequent reactions as such. Other methods of separation include chromatography and liquid-liquid extraction with appropriate solvents.

Likewise, where the reaction is terminated at the end of stage two the resultant fumarate half-ester may be isolated by the above techniques.

Although specific examples of the invention have been set forth, it is not intended to limit the invention solely thereto, but to include all the variations and modifications falling within the scope of the appended claims.

I claim:

1. A method of isomerizing a maleic acid half-ester, corresponding to the formula

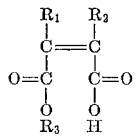

where $R_1$ and $R_2$ are independently selected from the group consisting of hydrogen, chlorine, bromine, and lower alkyl and $R_3$ is an organic radical derived by eliminating the hydroxyl group from a monohydric alcohol capable of forming a maleic acid half-ester, to the corresponding fumaric acid half-ester, which comprises heating the maleic acid half-ester in the presence of a catalytic amount of a chloride selected from the group consisting of titanium tetrachloride, and silicon tetrachloride.

2. The method of claim 1 where the catalyst is titanium tetrachloride.

3. The method of claim 1 where the catalyst is silicon tetrachloride.

4. A method of isomerizing an alkyl hydrogen maleate wherein the alkyl group contains 1 to 10 carbon atoms to the corresponding alkyl hydrogen fumarate which comprises heating an alkyl hydrogen maleate in the presence of a catalytic amount of a chloride selected from the group consisting of titanium tetrachloride, and silicon tetrachloride.

5. The method of claim 4 where the catalyst is silicon tetrachloride.

6. The method of claim 4 where the catalyst is titanium tetrachloride.

7. A method of preparing beta-hydroxyalkyl esters which comprises (A) heating an anhydride corresponding to the formula

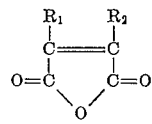

where $R_1$ and $R_2$ are independently selected from the group consisting of hydrogen, chlorine, bromine, and lower alkyl with a monohydric alcohol for a time sufficient to open the anhydride ring and form the corresponding maleate half-ester, (B) adding a catalytic amount of a chloride selected from the group consisting of titanium tetrachloride, and silicon tetrachloride and heating the reaction for a time sufficient to isomerize the maleate half-ester in the reaction mixture to the corresponding fumarate half-ester, (C) heating the reaction product of step (B) with an alkylene oxide for a time sufficient to esterify the free carboxyl group of the fumarate half-ester forming a beta-hydroxyalkyl ester group.

8. A method as in claim 7 where the isomerization catalyst in step (B) is titanium tetrachloride and where the alkylene oxide in step (C) is selected from the group consisting of ethylene oxide and propylene oxide.

9. A method as in claim 7 where the monohydric alcohol is an alkanol containing 1 to 10 carbon atoms.

10. A method as in claim 9 where the isomerization catalyst is titanium tetrachloride and where the alkylene oxide is selected from the group consisting of ethylene oxide and propylene oxide.

References Cited

UNITED STATES PATENTS

| 3,190,899 | 6/1965 | Walton et al. | 260—485 |
| 3,078,302 | 2/1963 | Franz et al. | 260—485 |
| 3,270,088 | 8/1966 | Hicks | 260—485 |

OTHER REFERENCES

Mayo et al.: Chem. Revs., vol. 27, pp. 403–407, 1940.

LORRAINE A. WEINBERGER, *Primary Examiner.*

T. L. GALLOWAY, *Assistant Examiner.*